(12) United States Patent
McNeil et al.

(10) Patent No.: US 7,262,938 B1
(45) Date of Patent: Aug. 28, 2007

(54) FLYING-TYPE DISK DRIVE SLIDER WITH SELF-BLENDING CONTACT PAD

(75) Inventors: Michael McNeil, Nederland, CO (US); Carolyn R. Girvin, Boulder, CO (US); Quinn J. Haddock, Longmont, CO (US)

(73) Assignee: Maxtor Corporation, Scotts Valley, CA (US)

( * ) Notice: Subject to any disclaimer, the term of this patent is extended or adjusted under 35 U.S.C. 154(b) by 0 days.

(21) Appl. No.: 11/353,638

(22) Filed: Feb. 14, 2006

Related U.S. Application Data

(62) Division of application No. 10/077,477, filed on Feb. 15, 2002, now Pat. No. 7,038,884.

(60) Provisional application No. 60/269,773, filed on Feb. 16, 2001.

(51) Int. Cl.
*G11B 21/20* (2006.01)
*G11B 17/32* (2006.01)
*G11B 5/60* (2006.01)

(52) U.S. Cl. .............. 360/235.8; 360/235.7; 360/235.1; 29/603.07

(58) Field of Classification Search .......... 360/235.7, 360/235; 29/603.07
See application file for complete search history.

(56) References Cited

U.S. PATENT DOCUMENTS

| | | | |
|---|---|---|---|
| 3,687,725 A | 8/1972 | Hartmann et al. | 428/325 |
| 4,622,613 A | 11/1986 | Nomura et al. | 360/322 |
| 5,175,658 A | 12/1992 | Chang et al. | 360/103 |
| 5,327,310 A | 7/1994 | Bischoff et al. | 360/237.1 |
| 5,396,386 A | 3/1995 | Bolasna et al. | 360/103 |
| 5,455,730 A | 10/1995 | Dovek et al. | 360/317 |
| 5,516,323 A | 5/1996 | Carlson et al. | 451/28 |
| 5,636,086 A | 6/1997 | Bolasna et al. | 360/103 |
| 5,650,893 A | 7/1997 | Bolasna et al. | 360/103 |
| 5,734,519 A | 3/1998 | Fontana et al. | 360/97.01 |
| 5,737,151 A | 4/1998 | Bolasna et al. | 360/103 |
| 5,796,551 A | 8/1998 | Samuelson | 360/103 |

(Continued)

FOREIGN PATENT DOCUMENTS

JP    56107363 A  *  8/1981

(Continued)

OTHER PUBLICATIONS

U.S. Appl. No. 10/077,477, filed Feb. 15, 2002, McNeil et al.

*Primary Examiner*—Angel Castro
*Assistant Examiner*—Christopher R. Magee

(57) ABSTRACT

The invention is generally directed to a slider that is particularly suited for dynamic load/unload disk drive designs. This slider desirably addresses potential disk damage associated with contact between sharp edges of the slider of the disk drive and the data storage surface of a corresponding disk. Any appropriate type/configuration of a disk drive may benefit from performing read/write operations utilizing the slider of the present invention. Generally, this slider includes at least one air bearing surface which enables the slider to "fly" above the read/write surface of the disk, and at least one self-blending contact pad disposed on the lower surface of the slider to reduce the potential for contact between any portion of the slider other than the self-blending contact pad(s) and the corresponding read/write surface of the disk.

20 Claims, 12 Drawing Sheets

U.S. PATENT DOCUMENTS

| | | | |
|---|---|---|---|
| 5,872,686 A | 2/1999 | Dorius et al. | 360/103 |
| 5,948,532 A | 9/1999 | Hwang et al. | 428/408 |
| 5,991,118 A * | 11/1999 | Kasamatsu et al. | 360/236.6 |
| 6,069,769 A | 5/2000 | Dorius et al. | 360/103 |
| 6,117,283 A | 9/2000 | Chen et al. | 204/192.23 |
| 6,160,683 A | 12/2000 | Boutaghou | 360/237.1 |
| 6,229,671 B1 * | 5/2001 | Boutaghou et al. | 360/235.1 |
| 6,236,543 B1 | 5/2001 | Han et al. | 360/236.6 |
| 6,243,222 B1 | 6/2001 | Boutaghou et al. | 360/73.03 |
| 6,707,631 B1 | 3/2004 | Haddock | 360/75 |
| 6,714,382 B1 * | 3/2004 | Alexopoulos et al. | 360/235.8 |
| 7,038,884 B1 * | 5/2006 | McNeil et al. | 360/235.7 |
| 2002/0075593 A1 * | 6/2002 | Ultican et al. | 360/235.7 |

FOREIGN PATENT DOCUMENTS

| | | | | |
|---|---|---|---|---|
| JP | 57078617 A | | | 5/1982 |
| JP | 61151827 A | * | | 7/1986 |
| JP | 63037874 A | * | | 2/1988 |
| JP | 04032080 A | * | | 2/1992 |
| JP | 05089626 A | * | | 4/1993 |
| JP | 05094683 A | * | | 4/1993 |
| JP | 05282646 A | * | | 10/1993 |
| JP | 10222829 A | | | 8/1998 |

* cited by examiner

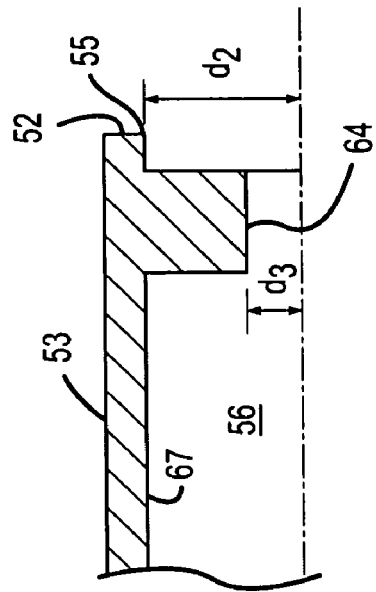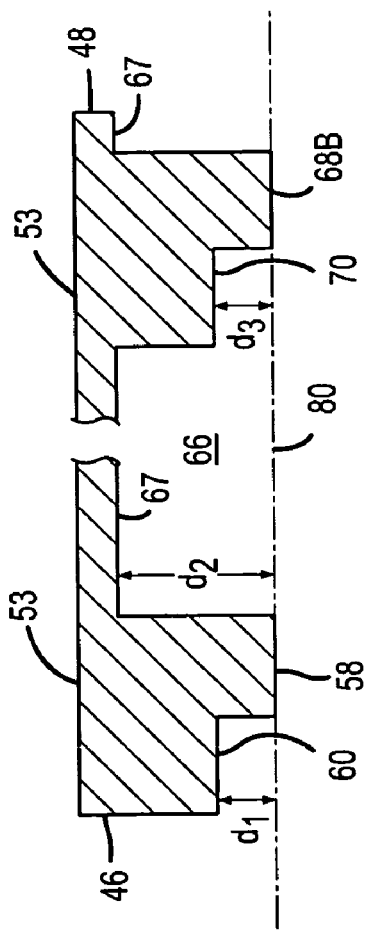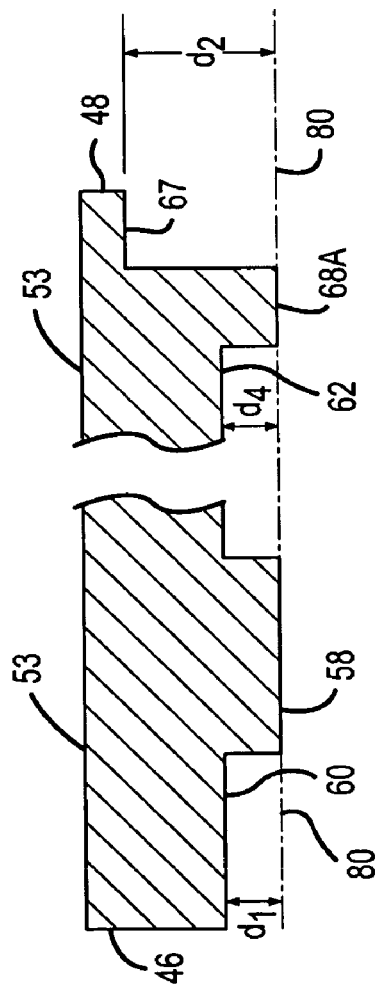

FLYING-TYPE DISK DRIVE SLIDER WITH SELF-BLENDING CONTACT PAD

RELATED APPLICATIONS

This patent application is a divisional of and claims priority under 35 U.S.C. § 120 to U.S. patent application Ser. No. 10/077,477, that was filed on Feb. 15, 2002 now U.S. Pat. No. 7,038,884, and that is entitled "FLYING-TYPE DISK DRIVE SLIDER WITH SELF-BLENDING CONTACT PAD", and further claims priority from U.S. Patent Application Ser. No. 60/269,773, that was filed on Feb. 16, 2001, and that is entitled a "SELF-BLENDING AIR BEARING FOR USE IN DYNAMIC LOAD DISK DRIVES." The entire disclosures of both U.S. Patent Application Ser. No. 60/269,773 and U.S. patent application Ser. No. 10/077,477 are incorporated by reference herein.

FIELD OF THE INVENTION

The present invention generally relates to disk drives and, more particularly, to a flying slider that includes at least one self-blending contact pad to reduce the potential for damage to the slider and/or the corresponding disk as a result of undesired contact between the same during disk drive operations.

BACKGROUND OF THE INVENTION

One common disk drive design generally includes at least one data storage disk (e.g., magnetic) with concentric data tracks, an air bearing slider for each data storage surface of each data storage disk that includes a read/write head for reading and writing data on the various data tracks on the corresponding data storage surface, an actuator arm assembly (generally including a rigid actuator arm or tip and a suspension) for holding the slider over the corresponding data storage surface, and a voice coil motor for moving the actuator arm assembly, and hence the head(s), across the corresponding data storage surface to the desired data track and holding the head over the relevant data track during a read or write operation. The air bearing slider flies above its corresponding data storage surface during disk drive operations on a boundary layer of air that is carried by the rotating data storage disk and that is appropriately compressed by the slider.

Disk drives increasingly reflect a need to improve the density at which information can be recorded on and reliably read from a data storage medium, e.g. a disk. Because the recording density of a disk drive is effectively limited by the distance between the head and the data storage medium, a goal of most flying-type slider designs is to operate a slider as closely as possible to a data storage medium while avoiding physical impact with the medium. In slider air bearing designs, a minimal amount of clearance (fly height) of the slider relative to the data storage medium is preferred so that the head can distinguish magnetic fields emanating from adjacently spaced tracks on the data storage medium.

Disk drive operations ideally require the slider to maintain a constant spacing between the read/write head and the data storage medium across all of the data tracks, from the central portion to the outer periphery of the data storage medium, e.g. a disk. This requirement presents a key technical challenge since the air velocity created by a rotating disk varies in both magnitude and direction relative to the annular position of the slider about the data storage medium. The problem is further exacerbated for disk drives having rotary actuators since slider pitch generally varies with respect to the annular position of the slider about the data storage medium. Thus, in addition to achieving an optimal minimal average spacing between the data storage medium and the slider, it is critical that the slider fly at a relatively constant height notwithstanding the variation in conditions the slider experiences during normal operation of the disk drive.

A slider may experience fly height disparities due to variations in one or both pitch and lateral roll. "Pitch" is a measure of the angle formed between the longitudinal axis of the slider and the direction of rotation of the data storage medium as measured in a plane parallel to a major surface of the data storage medium. The pitch of the slider varies in a disk drive as the slider moves from track to track across the data storage medium. The pitch of the slider also varies in a disk drive when the slider moves in response to forces, e.g. stress, exerted upon it. Lateral roll, on the other hand, is a measure of the angle of rotation about the longitudinal axis of the slider. Variations in lateral roll occur when a slider experiences a skewed air flow and/or when the slider impacts the data storage medium e.g. during a contact event or loading/unloading of the slider relative to the corresponding data storage medium.

A slider also experiences varying conditions during movement of the positioning system as it accesses data on various portions of the data storage medium. Movement of the slider across the data storage medium can lead to dramatic variation in lateral roll and pitch, and a resultant variation in fly height which could result in the slider contacting the surface of the data storage medium. The above-noted phenomena are all reasons that a slider must be able to manage pitch and roll variations. Additionally, contact events such as dropping or striking the disk drive can cause the slider to contact and damage the data storage medium.

A wide variety of disk drive and slider designs have been proposed and implemented to reduce damage to the data storage medium and/or reduce the frequency of contact between the slider and the data storage medium. Specifically, harder disk substrates have been employed to reduce damage inflicted upon the disk due to contact from the slider. However, such a development simply requires even greater control of the pitch and lateral roll of the slider since contact with the harder disk can potentially damage the slider. Additionally, blends have been added to the corners of one or more air bearing surfaces of conventional sliders, but this has resulted in sliders which demonstrate wide variations in one or more of fly height, pitch, and lateral roll. Finally, pads have been proposed for the lower surface of the slider for providing a contact surface during a shock event and in load/unload operations. Notwithstanding these efforts, it would be desirable to develop a slider design which prevents damage to the disk surface during any of contact, loading, and operation.

SUMMARY OF THE INVENTION

The present invention is generally directed to disk drives. More specifically, the present invention is generally directed to a "flying-type" slider for a disk drive or a slider that is at least slightly spaced from its corresponding data storage surface during normal disk drive operations (e.g., disposed on an air bearing between the slider and the corresponding disk). This slider addresses the potential damage to the slider and/or the disk that may result from contact between sharp edges of the slider and the data storage surface of the corresponding disk in a particularly desirable manner. Although the slider associated with the present invention is particularly suited for use with dynamic load/unload type disk drives, it may also be appropriate for contact start/stop type disk drives as well. Generally, the slider that will now be described may be used with any type/configuration of a disk drive that would be appropriate.

In a first aspect of the present invention, the slider includes a slider body that extends at least generally along a first reference axis. The slider body in turn includes a leading edge and a trailing edge that is longitudinally spaced from the leading edge relative to the reference axis, as well as first and second sides that are generally longitudinally extending and laterally spaced relative to this first reference axis. The slider body also has an upper surface and a corresponding lower surface which projects at least generally toward a data storage medium (e.g., disk) of the disk drive when the slider is installed in the disk drive. This lower surface of the slider body includes at least one air bearing surface. The data storage medium moves relative to the slider when incorporated in the disk drive in a direction at least generally from the leading edge of the slider body to the trailing edge of the slider body. The slider further includes at least one self-blending contact or shock pad (hereafter a first self-blending contact pad) that is disposed on the lower surface of the slider body. That is, the first self-blending contact pad is separately formed from the slider body. An entirety of the first self-blending contact pad is generally spaced from the first reference axis along which the slider body extends. Moreover, the first self-blending contact pad is also generally softer than the data storage medium such that any contact between the first self-blending contact pad and the corresponding data storage medium during disk drive operations wears away a portion of the first self-blending contact pad. That is, the first self-blending contact pad associated with the first aspect is specifically designed to wear when contacting a corresponding data storage media during disk drive operations.

Various refinements exist of the features noted in relation to the subject first aspect of the present invention as well. Further features may also be incorporated in the subject first aspect of the present invention as well. These refinements and additional features may exist individually or in any combination. As noted, the first self-blending contact pad is separately formed from the slider body in the case of the first aspect, and is preferably formed from a different material than the slider body. In one embodiment, the entirety of the first self-blending contact pad can be formed: 1) of a first material which has a hardness of less than about 9 on the Mohs hardness scale; 2) of carbon; 3) of a non-polymer; 4) of a material that sublimates directly into a gas upon the first self-burnishing contact pad being burnished by contact with the corresponding data storage disk during disk drive operations or one that will in effect undergo a chemical change (e.g. combust) when exposed to the types of temperatures encountered while being burnished during contact; 5) of a material that is softer than that which defines the slider body; 6) of a material having a modulus of elasticity of no more than about 500 GPa; or 7) any combination of the foregoing. Typically, the first self-blending contact pad is formed on (but separate from) a carbon overcoat that is applied to the lower surface of the slider body (i.e., the first self-blending contact pad would be formed after the application of such a carbon overcoat, and thereby after the formation of the slider body).

The first self-blending contact pad of the first aspect can be positioned at or near the leading or trailing edge of the slider body. In one embodiment, a self-blending contact pad is disposed on the lower surface of the slider body at least generally at each of the four corners of the slider body. In any case, the first self-blending contact pad is preferably not an air bearing surface. This first self-blending contact pad may protrude from the lower surface of the slider body by any appropriate amount, so long as the first self-blending contact pad does not contribute any significant portion of the total uplifting forces that are exerted on the slider during disk drive operations. In one embodiment, the first self-blending contact pad contributes less than 1% of the total lifting force that is exerted on the slider during disk drive operations.

The slider body associated with the first aspect may include a pressurizing step for directing an airflow under a corresponding air bearing surface. The first self-blending contact pad can be positioned on this pressurizing step. In one embodiment, the first self-blending contact pad is disposed at a peripheral edge of this pressurizing step, while in another embodiment the first self-blending contact pad is spaced from this peripheral edge, but nonetheless still on the pressurizing step. In the second instance, the first self-blending contact pad may be disposed on a protrusion that is formed on the lower surface of the slider body in order for the first self-blending contact pad to protrude to the desired degree.

The lower surface of the slider body associated with the first aspect may include a corner or edge that is spaced inwardly from one of the sides of the slider body (which is itself an edge or corner), or at least generally in the direction of the first reference axis. The first self-blending contact pad may be disposed at this edge, spaced from this edge at least generally in the direction of the first reference axis, or disposed over this edge. As an example of the last instance, the first self-blending contact pad may be disposed on at least first and second surfaces of the lower surface of the slider body that are at least generally perpendicular to each other.

In a second aspect of the present invention, the slider includes a slider body that extends at least generally along a first reference axis. The slider body in turn includes a leading edge and a trailing edge that is longitudinally spaced from the leading edge relative to the reference axis, as well as first and second sides that are generally longitudinally extending and laterally spaced relative to this first reference axis. The slider body also has an upper surface and a corresponding lower surface which projects at least generally toward a data storage medium of the disk drive when the slider is installed in the disk drive. This lower surface of the slider body includes at least one air bearing surface. The data storage medium moves relative to the slider when incorporated in the disk drive in a direction at least generally from the leading edge of the slider body to the trailing edge of the slider body. The slider further includes at least one self-blending contact or shock pad (hereafter a first self-blending contact pad) that is disposed on the lower surface of the slider body. An entirety of the first self-blending contact pad is generally spaced from the first reference axis along which the slider body extends. The entirety of the first contact pad is made of carbon having a hardness of less than about 9 on the Mohs scale.

Various refinements exist of the features noted in relation to the subject second aspect of the present invention as well. Further features may also be incorporated in the subject second aspect of the present invention as well. These refinements and additional features may exist individually or in any combination. Generally, those various features discussed above in relation to the first aspect of the present invention may be incorporated in this second aspect, individually, or in any combination.

A third aspect of the present invention is embodied by a method for operating a disk drive that includes a data storage disk and a slider. The slider includes leading and trailing edges that are longitudinally spaced relative to a first reference axis, first and second sides that are laterally spaced relative to this first reference axis, and a lower surface. This lower surface generally has at least one air bearing surface and a shock pad system that in turn includes at least one shock pad. The method includes flying the slider above the data storage disk and directing the slider toward the data storage disk during the flying step. This results in the slider contacting the data storage disk. In other words, during flight of the slider, one or more factors (e.g., a shock event, a load/unload operation) causes the slider to be directed toward the corresponding data storage disk until a portion of the slider contacts at least a portion of the corresponding data storage disk. The method of the third aspect includes limiting contact between the slider and the data storage disk to the shock pad system. In other words, the only portion of the slider that contacts the corresponding data storage disk is at least one shock pad (hereafter a first shock pad). The first shock pad is then burnished by the data storage disk without removing any substantial portion of the data storage disk during the time that the slider is in contact with the data storage disk. In other words, the surface(s) of at least one shock pad is worn away and/or altered by contacting the slider with the disk in the case of the third aspect.

Various refinements exist of the features noted in relation to the subject third aspect of the present invention as well. Further features may also be incorporated in the subject first aspect of the present invention as well. These refinements and additional features may exist individually or in any combination. For instance, the burnishing step may include forming a flat on the first shock pad. A "flat" is an at least substantially planar surface. Any subsequent contact between such a flat and the corresponding data storage disk reduces the overall unit pressure that is exerted on the slider and disk as a result of this contact in comparison to prior to formation of this flat. The burnishing of the first shock pad in the case of the third aspect can include increasing the surface area of the first shock pad that interfaces with the data storage disk as a result of each subsequent contact between the first shock pad and its corresponding data storage disk. Burnishing of the first shock pad may continue until an edge of the slider body is exposed (i.e., this edge is not originally exposed). Any subsequent contact between the flat which contains this edge and the data storage disk exposes the slider and disk to a reduced overall unit pressure than if the edge itself contacted the corresponding data storage disk. Therefore, even though an edge of the slider body is exposed and contacting the corresponding data storage disk, the potential for damage to the slider and/or the corresponding data storage disk is still reduced by the noted reduced unit pressure.

BRIEF DESCRIPTION OF THE DRAWINGS

FIG. 4A is a cross-sectional view of the slider of FIG. 3, taken along line 4A-4A.

FIG. 4B is a cross-sectional view of the slider of FIG. 3, taken along line 4B-4B.

FIG. 4C is a cross-sectional view of the slider of FIG. 3, taken along line 4C-4C.

DETAILED DESCRIPTION

The present invention will now be described in relation to the accompanying drawings which at least assist in illustrating its various pertinent features. By way of initial summary, the present invention relates to disk drives and, more particularly, to sliders for disk drives which are designed to fly above a data storage surface of the corresponding data storage media (e.g., disk) of the disk drive during disk drive operations. Further, the present invention concerns the proclivity of conventional slider features, such as edges of ABS surface(s), edges of pressurizing step(s), and/or other edges on the lower surface of the slider body, which may cause damage to the data storage surface of the corresponding data storage media as a result of these edges first contacting the read/write surface of the data storage media during a shock event and/or during loading/unloading of the slider from its corresponding disk. Although the slider of the present invention is particularly suited for dynamic load/unload disk drive configurations, it may have application for contact start/stop disk drive configurations as well.

Figure 1:
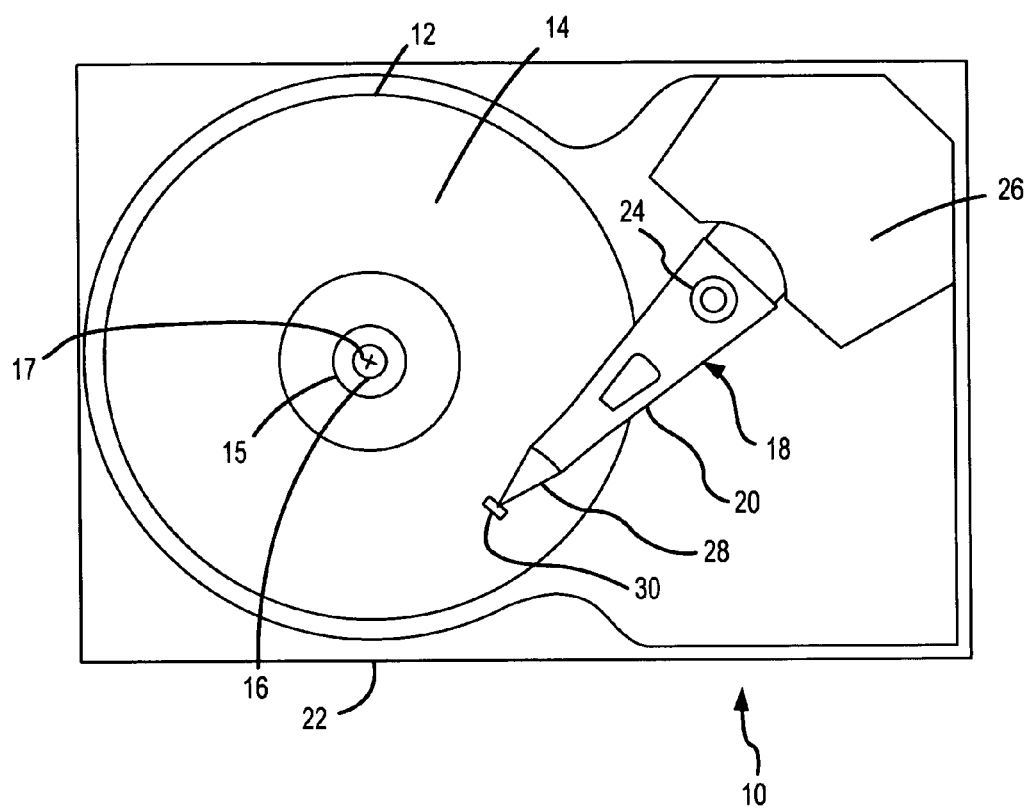
FIG. 1 is a top view of one embodiment of a disk drive.

One embodiment of a disk drive 10 which may utilize one or more principles of the present invention is presented in FIG. 1. The disk drive 10 includes one or more typically horizontally disposed disks 12 which are typically disposed in spaced and parallel relation. Each disk 12 preferably includes one, and possibly a pair of, oppositely disposed data storage surfaces 14 on which information may be stored and retrieved. Each of these disks 12 can be characterized as a computer-readable storage medium having a plurality of concentrically disposed tracks (not shown) on each of its data storage surfaces 14. The disk(s) 12 is mounted on typically an at least generally vertically disposed spindle 16 for rotation about a spindle axis 17 which is coincident with the spindle 16. Rotational drive forces for the disk(s) 12 are provided by a spindle motor 15.

Information may be read from one or more of the disks 12, and preferably written to these disks 12, utilizing an actuator arm assembly 18 of the disk drive 10. The actuator arm assembly 18 generally includes one or more actuator arms 20 or an actuator block (e.g., "E-block") which is pivotally interconnected with a base plate 22 of the disk drive 10 via a hub 24. Typically, the actuator arm 20 is designed as a rigid structure, such that there is at least substantially no deflection of the actuator arm 20, or any portion thereof, under normal operating conditions. The actuator arm assembly 18 is commonly referred to as a rotary type. Other types of actuator arm assemblies may be utilized by the disk drive 10, such as a linear actuator arm assembly (not shown). In any case, movement of the actuator arm assembly 18 is affected through a voice coil motor (VCM) 26 which includes a magnet(s) and a coil of fine wire (not shown). Any appropriate drive may be utilized for the configuration of the actuator arm assembly 18 being utilized.

Extending from each actuator arm 20 is a load beam or suspension 28 which is appropriately interconnected with its corresponding actuator arm 20 (e.g., via staking). One load beam 28 is generally provided for each of the data storage surfaces 14 utilized by the disk drive 10. Each load beam 28 generally includes a hinge/spring assembly (not shown) to bias the load beam 28 toward the corresponding disk 12 and to enable controlled flexure of the load beam 28 during operation of the disk drive 10. Disposed on an end portion of each load beam 28 is a slider 30. An appropriate transducer or head is mounted on each slider 30 and is generally able to read information from the data storage surface 14 of the corresponding disk 12, and preferably which is further capable of writing information to the data storage surface 14 of the corresponding disk 12 as well. Flexure of each load beam 28, through the corresponding hinge/spring assembly, is utilized to enable the corresponding slider 30 to move away from the corresponding disk 12 to a predetermined position of sorts, or to accurately maintain the fly height of the head 30 (i.e., distance of the slider 30 from the corresponding disk 12 during operation of the disk drive 10). Both the rotational speed of each disk 12, which directs the corresponding slider 30 away from the corresponding disk 12, and the flexure of the corresponding load beam 28 (via the hinge/spring assembly), which again biases the corresponding slider 30 toward the disk 12, cooperate to determine the fly height of the slider 30.

Figure 2:
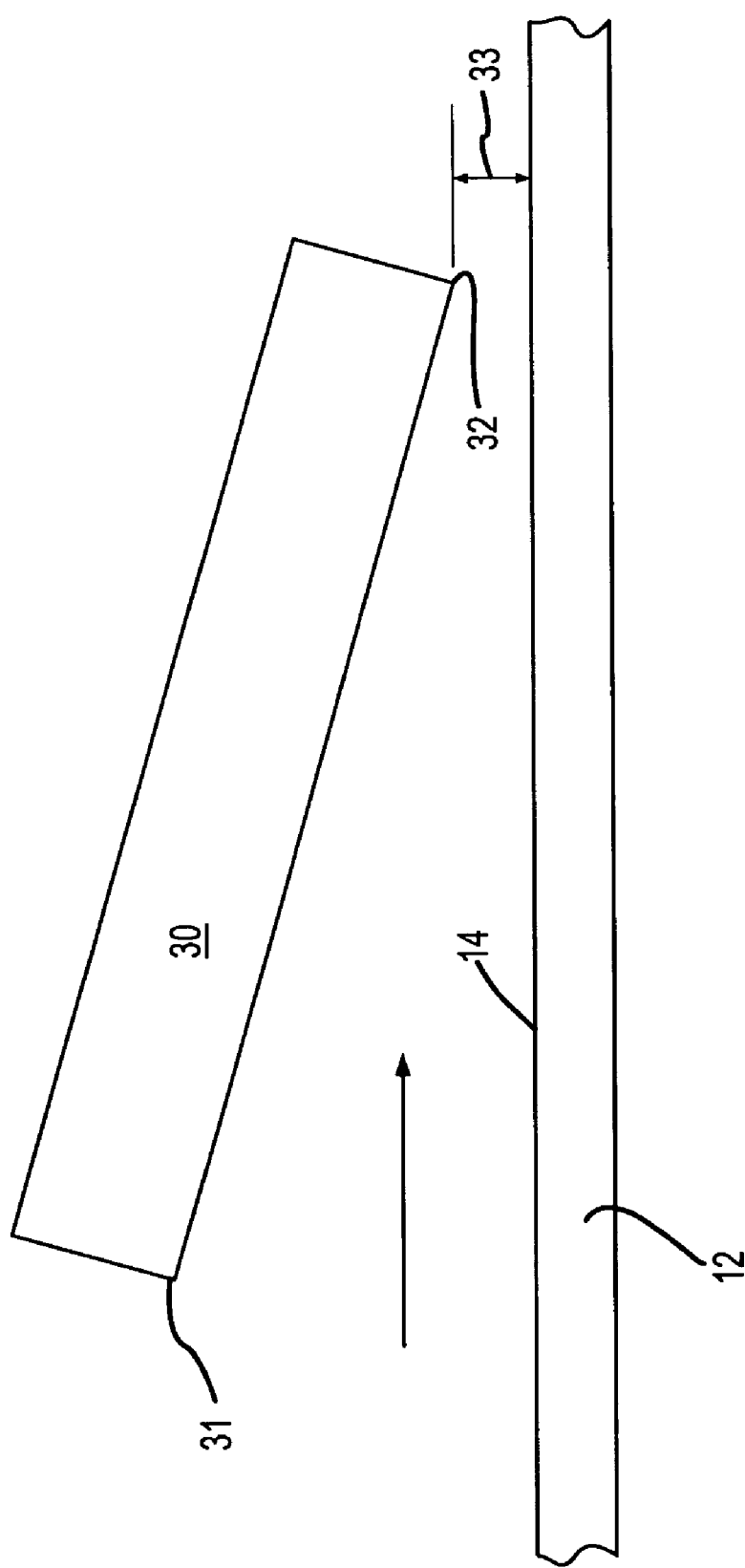
FIG. 2 is an enlarged schematic (in side view) of a flying-type slider used by the disk drive of FIG. 1 during disk drive operations.
Figure 3:
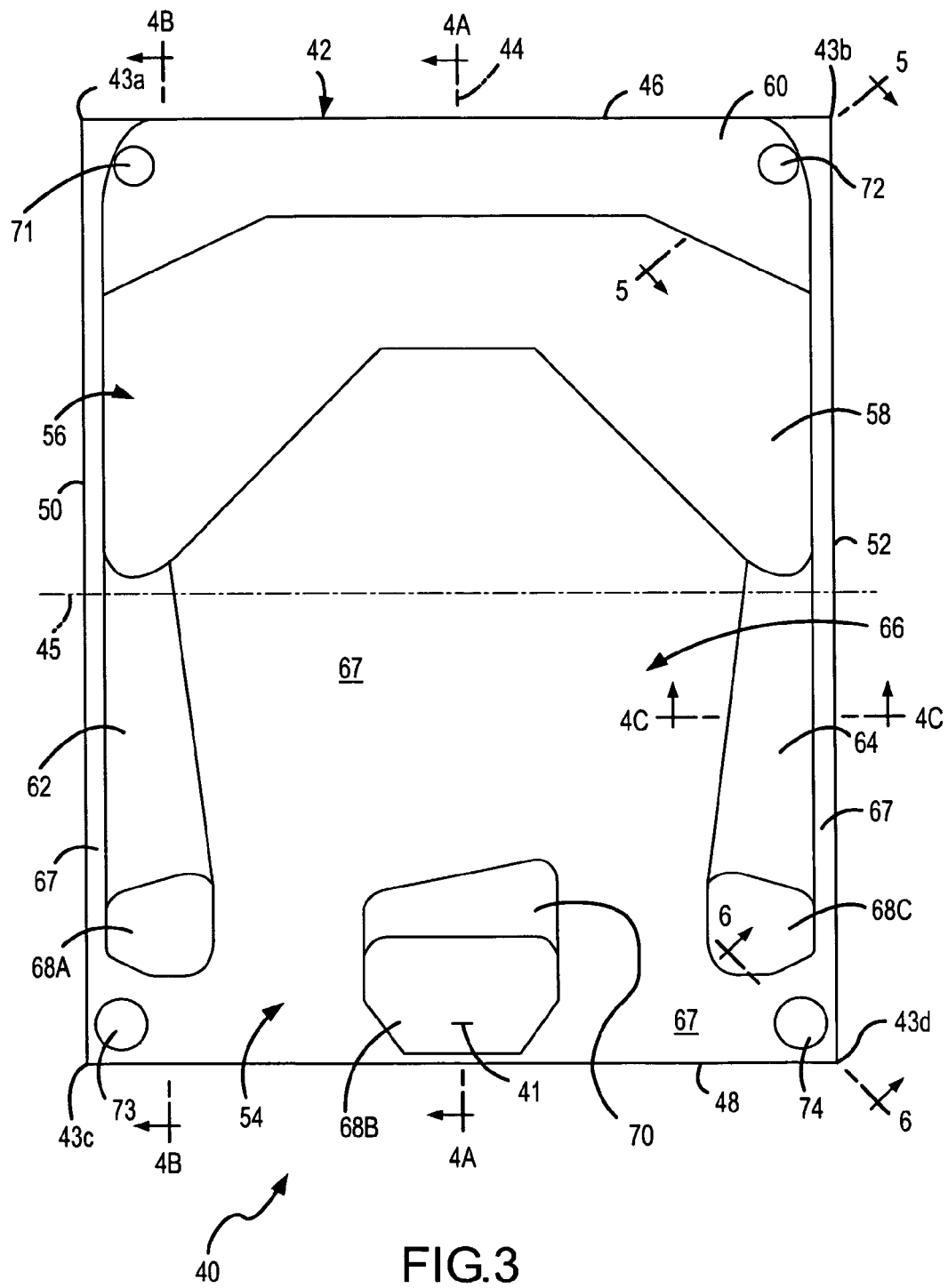
FIG. 3 is a bottom view of one embodiment of a slider which may be utilized by the disk drive of FIG. 1.

The slider 30 of the disk drive 10 may be configured to "fly" on an air bearing during rotation of its corresponding data storage disk 12 at a sufficient velocity. This is schematically illustrated in FIG. 2. Here the direction of the rotation of the disk 12 relative to the slider 30 is represented by the arrow, while the fly height of the slider 30 is represented by reference numeral 33 (typically measured from a reference plane that is disposed at the mean of the surface roughness of the disk 12). In FIG. 2, the slider 30 is disposed at a pitch angle such that a leading edge 31 of the slider 30 is disposed further from its corresponding data storage disk 12 than a trailing edge 32 of the slider 30. The transducer would typically be incorporated on the slider 30 at least generally toward its trailing edge 32 since this is positioned closest to its corresponding disk 12. Other pitch angles could be utilized for flying the slider 30.

FIGS. 3 and 4A-C illustrate general features of a slider 40 which may be used in place of the slider 30 of the disk drive 10 of FIG. 1, or in any other appropriate disk drive configuration. The slider 40 is particularly suited for dynamic load/unload disk drives, but may have application in contact start/stop type disk drives as well. Generally, the slider 40 functions to carry an appropriate transducer or head 41 for reading information from and/or writing information to the data storage surface 14 of the corresponding disk 12 in a manner known in the art (e.g., through sending signals between the head 41 and the disk 12, such that there is an operative interface of sorts therebetween). Typically the head 41 will be embedded within the slider 40. Any appropriate technology may be used for the head 41, including without limitation magneto resistive (MR), giant magneto resistive (GMR), colossal MR, and other transducers.

The slider 40 includes a slider body 42 on which the head 41 is appropriately mounted (e.g., typically by being embedded within the slider body 42 as noted). The slider body 42 extends longitudinally at least generally along a first reference axis 44. Hereafter, in relation to the slider 40, the term "longitudinal" or the like refers to a direction which is along or parallel to the first reference axis 44, while the term "lateral", or the like, refers to a direction which is at least generally transverse or perpendicular to the first reference axis 44 (and thereby parallel to a longitudinal midline/second reference axis 45 associated with the slider 40). An at least generally rectangular configuration or profile is utilized by the slider body 42. In this regard, the slider body 42 includes a leading edge 46 which is at least generally laterally extending, a trailing edge 48 which is at least generally laterally extending and which is longitudinally spaced from the leading edge 46 (i.e., spaced from the leading edge 46 along the first reference axis 44), and first and second sides 50, 52, respectively, which are laterally spaced and extend longitudinally between the leading edge 46 and the trailing edge 48. This profile defines a pair of front corners 43a, 43b and a pair of rear corners 43c, 43d for the slider body 42. Orientational variation(s) from that illustrated in FIG. 3 for one or more of the leading edge 46, the trailing edge 48, and the sides 50, 52 may be appropriate (e.g., a square configuration).

The slider body 42 includes a lower surface 54 that at least generally projects towards the data storage surface 14 of the corresponding disk 12 when installed in the disk drive 10, and further that is opposite an upper surface 53 of the slider body 42. The lower surface 54 of the slider body 42 is configured to allow the slider 40 to fly in a desired manner (e.g., at a desired fly height 33 per FIG. 2) during disk drive operations. In this regard, the lower surface 54 includes an air bearing surface system (or ABS system) 56 that protrudes from a base 67 of the slider body. All air bearing surfaces of the ABS system 56 are illustrated as being contained within a reference plane 80 that is spaced from the base 67 by a distance $d_2$. The ABS system 56 includes a front air bearing surface or ABS pad 58 that is longitudinally spaced from the leading edge 46, and further that is spaced laterally inwardly from each of the sides 50, 52. The entire front ABS pad 58 is disposed on the forward half of the slider body 42 (i.e., the front ABS pad 58 is disposed between the leading edge 46 of the slider body 42 and the longitudinal midline 45 of the slider body 42).

Air that is carried by the rotating disk 12 is directed under the front ABS pad 58 to exert an upwardly directed lifting force thereon via a pressurizing step 60. The pressurizing step 60 is disposed forward of the front ABS pad 58, or in the direction of the leading edge 46, such that the pressurizing step 60 is disposed between the leading edge 46 and the front ABS pad 58. The front pressurizing step 60 is recessed relative to the reference plane 80 by a distance $d_1$ that is of an amount to allow the front ABS pad 58 to function as a component of the ABS system 56. In one embodiment, the distance $d_1$ is within a range of about 100 nanometers to about 150 nanometers, and in another embodiment is about 127 nanometers.

First and second longitudinally extending and laterally spaced rails 62, 64 protrude from the base 67 and extend along the lower surface 54 of the slider 40 from the rear portion of the front ABS pad 58 toward, but not to, the trailing edge 48 of the slider body 42. These rails 62, 64 are slightly spaced laterally inwardly from the corresponding sides 50, 52. These rails 62, 64, along with the base 67 and the front ABS pad 58, collectively define a negative pressure or suction cavity 66. Generally, the depth of the base 67 (i.e., the amount that the same is recessed from the reference plane 80), along with the "confinement" provided by the rails 62, 64 and the front ABS pad 58, allow a negative pressure to develop within the suction cavity 66. In one embodiment, the base 67 is recessed from the plane 80 by the distance $d_2$ that is within a range from about 1,800 nanometers to about 2,000 nanometers, and in another embodiment that is about 1,900 nanometers, in order to generate a desired negative pressure within the suction cavity 66. That is, air which flows over the front ABS pad 58 generates a negative pressure within the ABS cavity 66 which may be utilized to have an effect upon and/or control the fly height 33 of the slider 40. In other words, those portions of the lower surface 54 which define that portion of the base 67 that forms the suction cavity 66 are recessed relative to the reference plane 80, and thereby relative to the ABS system 56, by an amount which is sufficient so as to allow a negative pressure of the desired amount to be generated in the suction cavity 66.

The ABS system 56 further includes a plurality of rear air bearing surfaces or ABS pads 68A-C that protrude from the base 67 an appropriate amount. Generally, these rear ABS pads 68A-C are longitudinally spaced from the front ABS pad 58 in the direction of the trailing edge 48 of the slider 40, and are at least generally disposed toward the trailing edge 48 of the slider 40. The rear ABS pad 68B is centrally disposed between the sides 50, 52 of the slider body 42 or on the first reference axis 44, and in the illustrated embodiment is coplanar with the reference plane 80. Disposed in front of the rear ABS pad 68B (or in the direction of the leading edge 46) is a central rear pressurizing step 70. Similar to the pressurizing step 60, the central rear pressurizing step 70 is recessed relative to the reference plane 80 by a distance a distance $d_1$ that is of a magnitude so as to allow the central rear ABS pad 68B to function as a component of the ABS system 56.

The rear ABS pad 68A is laterally spaced from the central rear ABS pad 68B in that it is disposed at least generally between the first side 50 of the slider 40 and the central rear ABS pad 68B. However, the rear ABS pad 68A is spaced laterally inwardly from the first side 50 in a similar manner to that of the first rail 62. The rear ABS pad 68A is also disposed more toward the leading edge 46 of the slider 50 than the rear ABS pad 68B. Disposed in front of the rear ABS pad 68A (or in the direction of the leading edge 46) is the first rail 62. The first rail 62 provides a "lateral" confinement for the suction cavity 66. However, the first rail 62 also functions to compress air under the rear ABS pad 68A. As such, the first rail 62 is recessed relative to the reference plane 80 (that contains the air bearing surface of the rear ABS pad 68A) by a distance $d_1$ that is of a magnitude so as to allow the rear ABS pad 68A to function as a component of the ABS system 56.

The rear ABS pad 68C is laterally spaced from the central rear ABS pad 68B in that it is disposed at least generally between the second side 52 of the slider 40 and the central rear ABS pad 68B. However, the rear ABS pad 68C is spaced laterally inwardly from the second side 52 in a similar manner to that of the second rail 64. The rear ABS pad 68C is also disposed more toward the leading edge 46 of the slider 50 than the rear ABS pad 68B. Disposed in front of the rear ABS pad 68C (or in the direction of the leading edge 46) is the second rail 64. The second rail 64 provides a "lateral" confinement for the suction cavity 66. However, the second rail 64 also functions to compress air under the rear ABS pad 68C. As such, the second rail 64 is recessed relative to the reference plane 80 (that contains the air bearing surface of the rear ABS pad 68C) by a distance $d_1$ that is of a magnitude so as to allow the rear ABS pad 68C to function as a component of the ABS system 56.

It should be appreciated that a variety of arrangements/configurations of air bearing surfaces may be utilized by the ABS system 56. For instance, each air bearing surface of the ABS system 56 need not be disposed coplanar with the reference plane 80. Each pressurizing step associated with each air bearing surface of the ABS system 56 need not be recessed the same amount relative to the reference plane 80. The various air bearing surfaces of the ABS system 56 also need not be symmetrical relative to the reference axis 44. Each of the various air bearing surfaces of the ABS system 56 may be disposed at a variety of longitudinal positions, and these positionings need not be symmetrical.

Normal disk drive operations are addressed using the various features of the slider 40 that have been thus described. Additional features are included in the design of the slider 40 such that the slider 40 at least reduces the potential for damage to the corresponding data storage surface 14 of the corresponding disk 12, the head 41 or the slider 40 in general, or both, which may result when the slider 40 impacts the disk 12. Impacts of this type may result if the disk drive 10 is exposed to shock event, during a load or unload operation of the slider 40 from its corresponding disk 12, or otherwise. Contact between the slider 40 and the corresponding disk 12 may be the result of excessive Pitch Static Attitude (PSA) and/or Roll Static Attitude (RSA). "Pitch Static Attitude" refers to a change in degree or angulation of the slider 40 at least generally about a reference axis 45 (e.g., to change the spacing between the data storage surface 14 and each of the leading edge 46 and the trailing edge 48 of the slider body 42). "Roll Static Attitude" refers to change in degree or angulation at least generally about the first reference axis 44 of the slider 40.

Generally, the lower surface 54 of the slider 40 includes various features that reduce the potential for sharp edges, corners, or other features on the slider 40 engaging the data storage surface 14 of the corresponding disk 12 (e.g., due to excessive PSA and/or RSA). In this regard, a plurality of self-blending contact pads 71-74 are disposed on the lower surface 54 of the slider body 42. These contact pads 71-74 are relatively small features on the slider 40, but nonetheless provide a desired function of attempting to protect the disk 12 from damage when contacted by the slider 40 (e.g., due to excessive PSA and/or RSA). Substantially no lifting forces are exerted on the slider 40 by the self-blending contact pads 71-74 (e.g., no more than about one percent of the total uplifting forces exerted on the slider 40 during normal disk drive operations are due to the presence of the self-blending contact pads 71-74 on the lower surface 54 of the slider body 42). Therefore, the contact pads 71-74 are not part of the ABS system 56. In one embodiment, each of the contact pads 71-74 contribute less than 1% of the total lifting force that is exerted on the slider 40 during disk drive operations.

Positionally, the contact pads 71-74 are disposed at least generally at the four corners 43*a-d* of the slider body 42. More specifically, the contact pad 71 is disposed at least generally at the corner 43*a* of the slider body 42, the contact pad 72 is disposed at least generally at the corner 43*b* of the slider body 42, the contact pad 73 is disposed at least generally at the corner 43*c* of the slider body 42, and the contact pad 74 is disposed at least generally at the corner 43*d* of the slider body 42. As such, the self-blending contact pads 71, 72 are disposed forwardly of the front ABS pad 58 such that the contact pads 71, 72 are approximately equidistantly spaced on opposite sides of the first reference axis 44, and further are disposed between the front ABS pad 58 and the leading edge 46 of the slider body 42. More specifically, contact pads 71, 72 are disposed on the pressurizing step 60 associated with the front ABS pad 58 and spaced laterally inwardly from the sides 50, 52, respectively, of the slider body 42. Ideally, the contact pads 71, 72 are positioned at least generally toward where the respective sides 50, 52 of the slider body 42 meet its leading edge 46 (e.g., at least generally toward/at the corners 43*a*, 43*b*).

Similarly, the second pair of self-blending contact pads 73, 74 are disposed rearwardly of each of the corresponding rear ABS pads 68A, 68C, respectively, such that the contact pads 73, 74 are approximately equidistantly spaced on opposite sides of the first reference axis 44, and further are disposed between each of the corresponding rear ABS pads 68A, 68C and the trailing edge 48 of slider body 42. Additionally, the contact pads 73, 74 are spaced laterally inwardly from corresponding sides 50, 52 of the slider body 42. Ideally, the contact pads 73, 74 are positioned at least generally toward where the respective sides 50, 52 of the slider body 42 meet its trailing edge 48 (e.g., at least generally toward/at the corners 43*c*, 43*d*).

Both the rear ABS pads 68A-C and the rear self-blending contact pads 73, 74 are disposed between the longitudinal midline 45 of the slider body 42 (i.e., half-way between the leading edge 46 and the trailing edge 48) and the trailing edge 48 of the slider 40. Each of the rear self-blending contact pads 73, 74 is disposed relatively close to the corresponding rear ABS pad 68A, 68C, with each respective contact pad 73, 74 being disposed rearwardly of its corresponding rear ABS pad 68A, 68C on the lower surface 54 of the slider 40.

Various attributes of the contact pads 71-74 contribute to realizing a desired functionality of attempting to protect the slider 40 and/or the corresponding disk 12 when the slider 40 is exposed to at least certain types of forces (e.g., excessive PSA and/or RSA). Generally, the pads 71-74 are specifically located relative to other features on the lower surface 54 of the slider body 42 that define a sharp edge, corner, or the like, and further the contact pads 71-74 are each made up entirely of a relatively soft material. These both enable the relevant contact pad 71-74 to be the initial, and more preferably the sole, contact of the slider 40 on its corresponding disk 12 when exposed to certain types of forces (e.g., under conditions of excessive PSA and/or RSA), and to thereafter more or less burnish immediately upon any such contact. As such, the contact pads 71-74 significantly reduce the potential for contact between the data storage surface 14 of the disk 12 and the various sharp edges or corners on the lower surface 54 of the slider body 42, thereby functioning as a contact buffer of sorts.

Preferably, each contact pad 71-74 is formed from a material that is softer, and more preferably significantly softer, than one (and more preferably both) of the slider body 42 and the disk 12. Accordingly, any contact between any one of the contact pads 71-74 and the disk 12 should result in a burnishing of the corresponding pad 71-74 that defines a flat or the like on such a pad 71-74. That is, the contact pads 71-74 are specifically designed to wear when contacted by the corresponding rotating disk 12. The contact pads 71-74 are not designed to absorb energy. Any energy that is absorbed by any of the contact pads 71-74 during contact with its corresponding rotating disk 12 is transformed into heat and does not compress the contact pads 71-74 to any significant degree. In one embodiment, each of the contact pads 71-74 has a hardness of less than about 9 on the Mohs hardness scale, and in another embodiment less than about 7 on the Mohs hardness scale.

Various materials may be appropriate for defining the contact pads 71-74. As a general matter, non-polymer materials are preferred for the contact pads 71-74. A highly preferred material for defining the contact pads 71-74 is carbon having a hardness of less than about 9 on the Mohs hardness scale. Carbon is very compatible with the environment within the disk drive 10 during disk drive operations, as well as the tribology (the science of the mechanisms of friction, lubrication, and wear of interfacing surfaces that are in relative motion) of the disk drive 10. It is highly desirable for the internal environment of the disk drive 10 to be kept free of contaminants, such as loose debris from components, external contaminants, particulates generated during operation, and/or magnetic particulate debris that can be carried by the air within the drive 10 during disk drive operations. The presence of such contaminants within the disk drive 10 can adversely affect one or more aspects of disk drive operations. Using carbon for the structure of the contact pads 71-74 reduces the potential for introducing contamination into the disk drive 10 as a result of contact between any of the pads 71-74 and the corresponding rotating disk 12. In this case, any particulates that may be generated by a burnishing of the contact pads 71-74 in a manner to be discussed in more detail below will be in the form of carbon (i.e., when the contact pads 71-74 are formed from carbon). At the temperatures to which such carbon particulates are exposed during disk drive operations, the carbon particulates from any burnishing of the contact pads 71-74 (as well as carbon on the contact pads 71-74 that is burnished) should turn into carbon dioxide. In other words, particles which wear off of any of the contact pads 71-74 during a contact event with the corresponding rotating disk 12 should at least almost immediately turn from a solid into a gas (e.g., by undergoing a chemical change), thereby preventing undesired particulate contamination of the interior of the disk drive 10. Although carbon is a preferred material for this and the above-noted reasons, any material which is softer than the data storage surface 14 of the corresponding disk 12, and which possesses physical properties which enable the material to burnish away and form a gas and/or vaporize upon exposure to the types of temperatures to which the contact pads 71-74 may be exposed during a contact event, may be utilized for defining the pads 71-74. Other materials, such as polymers, would not sublimate in this manner, but instead would stay within the disk drive 10 in the form of particulates that could adversely affect disk drive operations, and are thereby not desired for the structure of the pads 71-74.

The lower surface 54 of the slider body 42 is sealed with a coating to reduce the potential for flaking during disk drive operations, and the above-noted contact pads 71-74 are formed on top of any such coating. That is, the contact pads 71-74 directly interface with the data storage surface 14 of the corresponding disk 12 when the slider 40 exposed to at least certain types of forces. In one embodiment, this coating is a carbon overcoat 49 (illustrated only in FIG. 5C, but which would be disposed between the contact pads 71-74 and the slider body 42 in the preferred embodiment) that is applied to the lower surface 54 of the slider body 42. Typical thicknesses for such a carbon overcoat 49 are within a range of about 30 Å to about 50 Å. The thickness of this carbon overcoat 49 is significantly greater than the thickness of the contact pads 71-74 as will be discussed in more detail below. Although the contact pads 71-74 that are disposed on top of any such carbon overcoat 49 may have a hardness that is the same as any carbon overcoat 49, more preferably the contact pads 71-74 have a hardness that is less than that of any carbon overcoat 49.

The contact pads 71-74 are formed after the formation of any carbon overcoat 49 that may be applied to the lower surface 54 of the slider body 42. The material which defines the self-blending contact pads 71-74 is preferably sputtered, but may be deposited, or plated in any manner onto desired portions of the previously formed slider body 42 on the lower surface 54 thereof. One method of sputtering generally includes applying a thin layer of carbon (or other appropriate contact pad material) to the areas of the slider body 42 where self-blending contact pads 71-74 are desired. Then a negative charge is applied to the contact pad material (i.e., carbon, or the like) in a vacuum vessel containing a sputtering gas, preferably argon, and the substrate to be sputtered (the lower surface 54 of the slider 40). Positively charged argon ions move towards the negatively biased contact pad material, and "hit" the contact pad material to loosen target atoms from the contact pad material. These target atoms then accelerate in the direction of the thin layer of carbon on the lower surface 54 of the slider body 42 where the atoms are stopped and bonded, forming a high precision deposition of self-blending contact pad material on the slider body 42 at the desired locations for the contact pads 71-74. Sputtering can be accomplished through a variety of methods, including, but not limited to, DC diode sputtering, magnetron sputtering, and radio frequency (RF) sputtering.

There are a number of other characteristics and features which are important in relation to the slider 40. One such characteristics or feature is the pitch angle at which the slider 40 is disposed when installed in the disk drive 10. Generally, the pitch angle for the slider 40 should be selected such that the self-blending contact pads 71-74 may, at least at some point in time, be in contact with the disk 12, and such that the front ABS pad 58 and the rear ABS pads 68A-C are generally never in contact with the disk 12. Preferably, no contact exists between any of the self-blending contact pads 71-74 and the disk 12 during disk drive operations after the disk drive 10 has undergone an initialization and/or loading procedure, which is generally on the initial start-up of the disk drive 10. Thus, each self-blending pad 71-74 preferably does not continually maintain contact with, and provide self-blending "contact pad" functions between, the slider 40 and the disk 12. However, when contact exists between any of the self-blending contact pads 71-74 and the corresponding disk 12, the primary function of the contact pad 71-74 is to protect one or both the slider 40 and the disk 12 from the other.

Both the location of the contact pads 71-74 relative to certain other features on the lower surface 54 of the slider body 42, as well as the amount of protrusion of such contact pads 71-74 in relation to the amount of protrusion of certain other features on this lower surface 54, are important in relation to having a relevant contact pad 71-74 be the initial and preferably sole source of contact between the slider 40 and the disk 12 when the slider 40 is exposed to at least certain types of forces (e.g., excessive PSA and/or RSA). First, these characteristics will be addressed in relation to the forwardly disposed contact pads, namely the self-blending contact pads 71 and 72. All discussion hereafter in relation to the contact pad 72 is equally applicable to the contact pad 71.

Figure 5A:
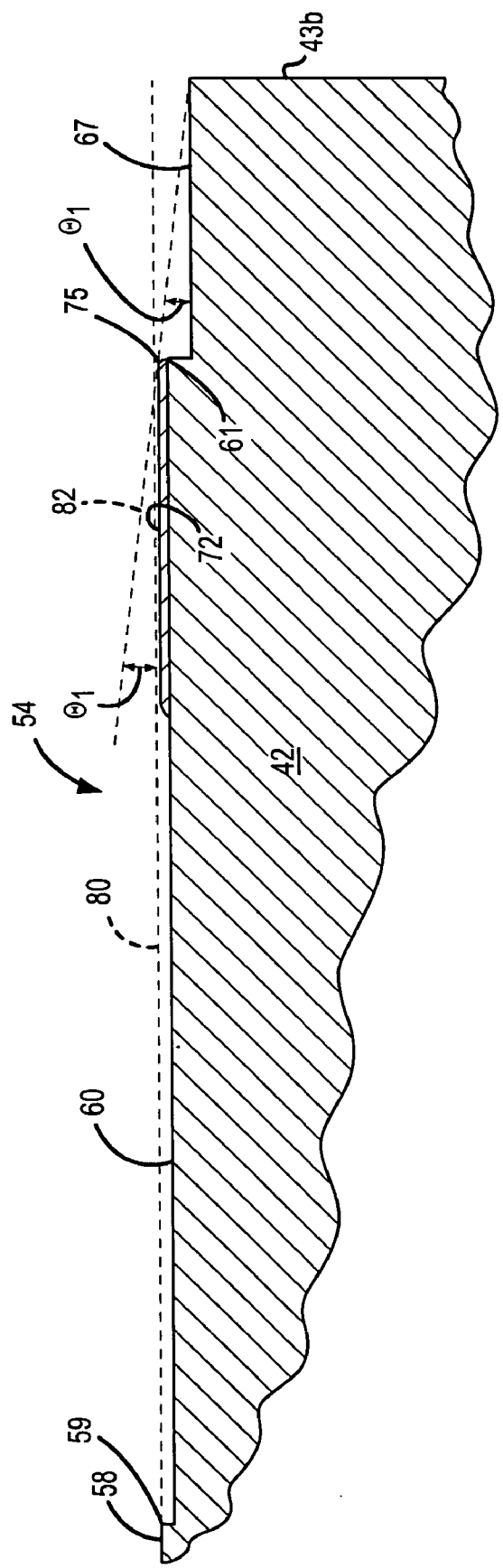
FIG. 5A is a partial cutaway view of the slider of FIG. 3, taken along line 5-5, showing the angular relationship between a corner of the slider body and a peripheral edge of one of the contact pads.
Figure 5B:
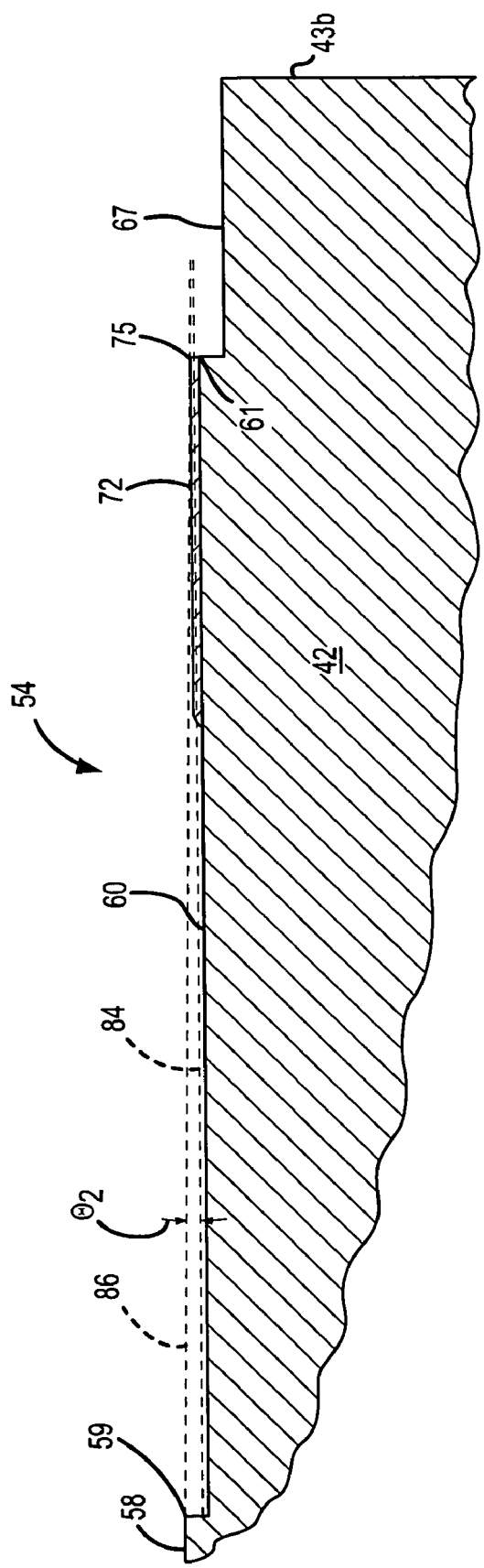
FIG. 5B is a partial cutaway view of the slider of FIG. 3, taken along line 5-5, showing the angular relationship between an edge of a front ABS pad and a peripheral edge of the adjacent contact pad.

FIGS. 5A and 5B illustrate first and second angles $\Theta_1$, $\Theta_2$, respectively, which illustrate certain desired relationships between various features of the lower surface 54 toward the leading edge 46 of the slider body 42 and for the case where the contact pad 72 does not protrude beyond the front ABS pad 58 (i.e., where the contact pad 72 does not extend beyond the reference plane 80). As shown, a perimeter of the front ABS pad 58 is defined by an edge or corner 59, a perimeter of the front pressurizing step 60 is defined by an edge or corner 61, a perimeter of the self-blending contact pad 72 is defined by an edge or corner 75, and the intersection between the leading edge 46 and the side 52 defines the corner 43b. Although each of the edges 59, 75, and 61, as well the corner 43b, is illustrated as being a point, such may be defined by a variety of other configurations (e.g., one or more of the edges 59, 75, and 61, as well as the corner 43b, may be rounded to a degree).

Referring specifically to FIG. 5A, the first critical angle $\Theta_1$ refers to an acute angle between the reference plane 80 (which contains the ABS system 56) and a reference plane 82. The reference plane 82 is oriented so as to be tangent to both the corner 43b (the intersection between the leading edge 46 and the side 52 on the lower surface 54 of the slider 40) at the lower surface 54 and that portion of the edge 75 of the self-blending contact pad 72 that is closest to the corner 43b. Note that the contact pad 72 is disposed at the edge 61 of the pressurizing step 60 in the illustrated embodiment. In any case, the first critical angle $\Theta_1$ is preferably greater than any amount of static pitch/roll to which the slider 40 would likely be exposed during disk drive operations. When positioned in this manner: 1) the contact pad 72 should be that portion of the slider 40 that would contact the data storage surface 14 of the corresponding rotating disk 12 upon occurrence of a shock event of some type or due to a load/unload operation that directs the side 52 of the slider 40 more toward the disk 12 than the side 50 (e.g., a movement at least generally about the axis 44); and 2) the contact pad 72 should prevent an edge 55 of the slider 40 (the intersection of the lower surface 54 and the side 52) from contacting the data storage surface 14 of the disk 12. The first critical angle $\Theta_1$ defines a tolerance range for pitch/roll variation of the slider 40 which ultimately depends on the flight characteristics of the slider 40. Accordingly, the first critical angle $\Theta_1$ is preferably steeper than any pitch/roll experienced by the slider 40 during disk drive operations. In one embodiment the first critical angle $\Theta_1$ is at least about 3 degrees. One parameter that at least assists in the definition of the first critical angle $\Theta_1$ is the thickness or height of the contact pad 72 (the distance which the contact pad 72 extends away from the slider body 42, since the contact pad 72 is separate and distinct from the slider body 42). In one embodiment, the thickness or height of the contact pad 72 is within a range of about 50 to about 200 nanometers.

Referring now to FIG. 5B, the second critical angle $\Theta_2$ refers to an acute angle between a reference plane 84 (that is parallel with the reference plane 80 that contains the ABS system 56) and a reference plane 86. The reference plane 86 is oriented so as to the at least generally tangent to both the edge 59 of the front ABS pad 58 and that portion of the edge 75 of the self-blending contact pad 72 that is closest to the corner 43b. The value of the second critical angle $\Theta_2$ is preferably small. In one embodiment, the second critical angle $\Theta_2$ is less than about 1 degree, and in a preferred embodiment is less than about ½ degree. Thus, the greater the distance between the edge 59 of the front ABS pad 58 and the self-blending contact pad 72, the smaller the second critical angle $\Theta_2$. One way of reducing the magnitude of the second critical angle $\Theta_2$ is to thereby position the self-blending contact pad 72 on the front pressurizing step 60 such that it is disposed as far as possible from the edge 59 of the front ABS pad 58. Another way to reduce the magnitude of the second critical angle $\Theta_2$ is to reduce the amount of vertical offset between the front ABS pad 58 and the contact pad 72. In the case of the illustrated embodiment where the front ABS pad 58 is coplanar with the reference plane 80, as the self-blending contact pad 72 approaches the reference plane 80, thereby approaching a same level of protrusion as the front ABS pad 58, the second critical angle $\Theta_2$ also becomes smaller. It should be appreciated that a combination of both factors may be utilized to achieve the desired magnitude for the second critical angle $\Theta_2$. It should also be appreciated that as the amount of protrusion of the contact pad 72 approaches that of the front ABS pad 58, the surface area of the contact pad 72 becomes more important. That is, the size of the contact pad 72 should be selected such that the contact pad 72 does not substantially contribute to the uplifting forces that are exerted on the slider 40 during disk drive operations (i.e., the contact pad 72 should be sized so as to not function as an air bearing surface).

In one embodiment, the self-blending contact pad 72 and the front ABS pad 58 are coplanar with each other (not shown). In another embodiment, the self-blending contact pad 72 is more protruded than the front ABS pad 58 (not shown). That is, the contact pad 72 extends beyond the reference plane 80 (in a direction that is away from the upper surface 53 of the slider body 42). In all instances, it should be appreciated that the contact pad 72 should be sized such that it does not become part of the ABS system 56. That is, in all instances the size of the contact pad 72 should be selected such that the contact pad 72 does not substantially contribute to the uplifting forces that are exerted on the slider 40 during disk drive operations. In one embodiment, the surface area of the contact pad 72 (that at least generally faces the data storage surface 14 of the corresponding disk 12) is no more than about 0.01 mm².

Figure 5C:
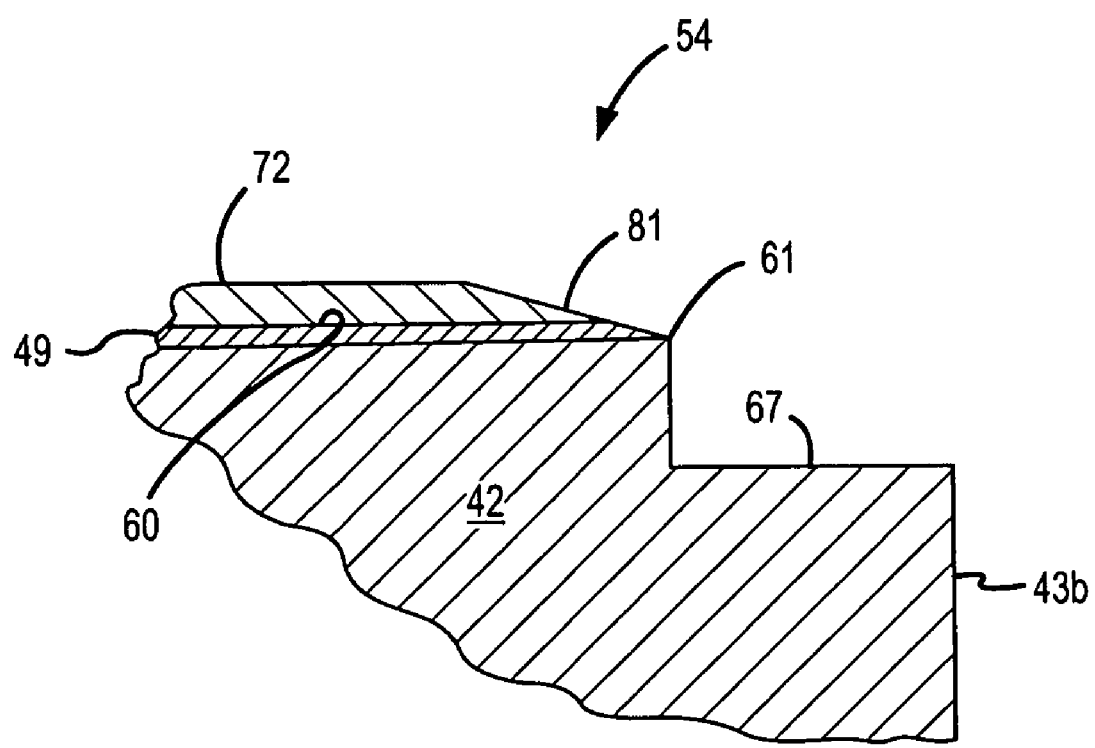
FIG. 5C is a partial cutaway view of the slider of FIG. 3 after there has been contact between the disk and the self-blending contact pad illustrated in FIGS. 5A-B.

Any contact between the contact pad 72 and the rotating disk 12 during disk drive operations is intended to burnish the contact pad 72 at least to a degree. A typical result of any such burnishing is illustrated in FIG. 5C. Contact between the pad 72 and the rotating disk 12 has burnished the contact pad 72 and formed a flat 81 on what was originally a portion of the edge 75 of the contact pad 72. Burnishing the contact pad 72 in this manner provides an advantage in reducing the unit pressure in at least certain situations. Generally, any subsequent contact between the flat 81 and the disk 12 in response to exposure of the slider 40 to a certain force will generate a smaller unit pressure than if this same force caused a contact between an edge 75 of the contact pad 72 and the disk 12. That is, upon exposure of the slider 40 to a force which tends to cause the slider 40 to move toward the rotating disk 12 in a manner that originally created the flat 81, the initial contact between the slider 40 and the disk 12 will be distributed over a larger area (the area of the flat 81) than prior to the original formation of the flat 80 (in which case the force is distributed over a portion of the edge 75 of the contact pad 72, which is of a smaller area and which thereby generates a higher unit pressure). It should be appreciated that the area of the flat 80 may increase on each subsequent contact event between the contact pad 72 and the rotating disk 12, and that multiple flats 80 of different orientations may be formed. In one embodiment, the burnishing of the contact pad 72 from contact with the rotating disk 12 may continue (from one or multiple, spaced-in-time contacts between the contact pad 72 and the disk 12) until a portion of the edge 61 of the pressurizing step 60 (part of the slider body 42) is exposed as shown in FIG. 5C. However, the edge 61 will be contained within the flat 81 on the pad 72 at this time. Therefore, even though subsequent application of a force on the slider 40 may cause contact between the edge 61 associated with the slider body 42 and the rotating disk 12, the unit pressure will be less as a result of the force being distributed over a larger area (the combined area of the flat 81 and the edge 61) than in the case where just the edge 61 contacts the disk 12 (just the area of the edge 61).

Figure 5D:
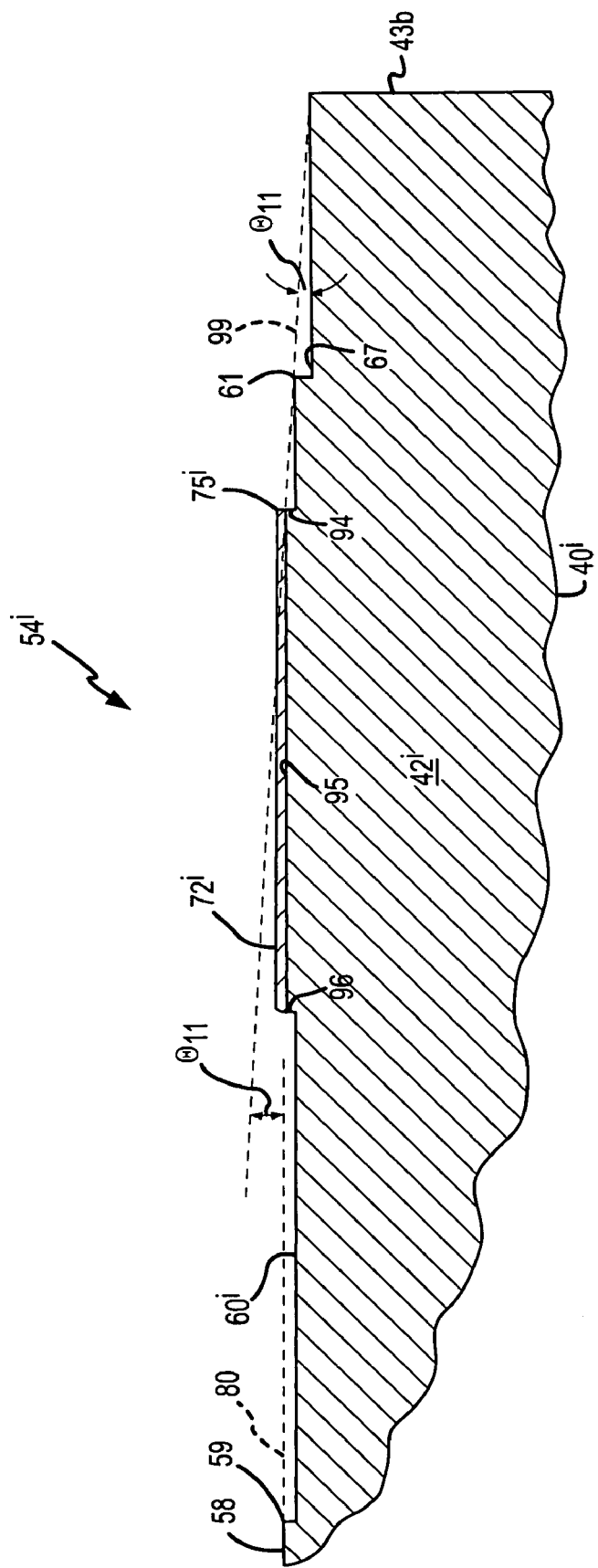
FIG. 5D is a partial cut away view of a variation of the slider of FIG. 3, taken along line 5-5, having the contact pad disposed away from the edge of a pressurizing step for the front ABS pad, and showing the angular relationship between a side edge of the slider body and another inward edge of the slider body.

A variation of the embodiment of FIGS. 5A-B is illustrated in FIG. 5D in the form of a slider $40^i$. Common structures/features between these embodiments are identified by the same reference numerals, and a superscripted "i" designation is used to denote the existence of at least one difference between the corresponding structures/features. There are three main differences between the embodiment of FIGS. 5A-B and FIG. 5D. One is that the self-blending contact pad $72^i$ is disposed away from the edge 61 of the front pressurizing step $60^i$ and the corner 43b. Another is that the self-blending contact pad $72^i$ of the embodiment of FIG. 5C is more protruded than the self-blending contact pad 72 of the embodiment of FIGS. 5A-B (i.e., it extends further from the step $60^i$). Finally, a protrusion 94 is formed on the front pressurizing step $60^i$ in the case of the embodiment of FIG. 5D. The contact pad $72^i$ is formed on this protrusion 94. The protrusion 94 is part of the slider body 42, and may be of any appropriate configuration (e.g., circular in plan view). A perimeter of this protrusion 94 is defined by an edge 96 that surrounds a face 95 of the protrusion 94. In the embodiment of FIG. 5D, the contact pad $72^i$ is coterminous with the face 95, although other variations are possible as will be discussed in more detail below. What is of importance is that the contact pad $72^i$ should be disposed such that the contact pad $72^i$ extends beyond a reference plane 99 that is tangent to the corner 43b (the intersection between the leading edge 46 and the side 52) and the edge 61 (of the pressurizing step $60^i$). This increases the potential that the contact pad $72^i$, and not the edge 61 or the corner 43b, will contact the corresponding data storage disk 12 upon exposure of the slider 40 to at least certain types of forces (e.g., excessive PSA and/or RSA).

Figure 5E:
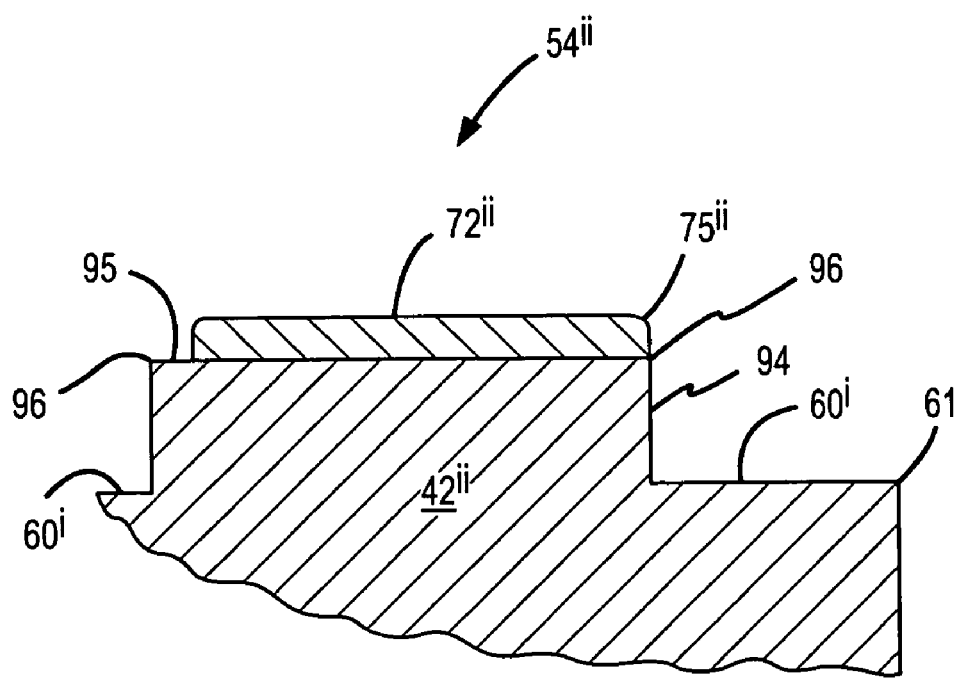
FIG. 5E is a variation of contact pad presented in FIG. 5D.
Figure 5F:
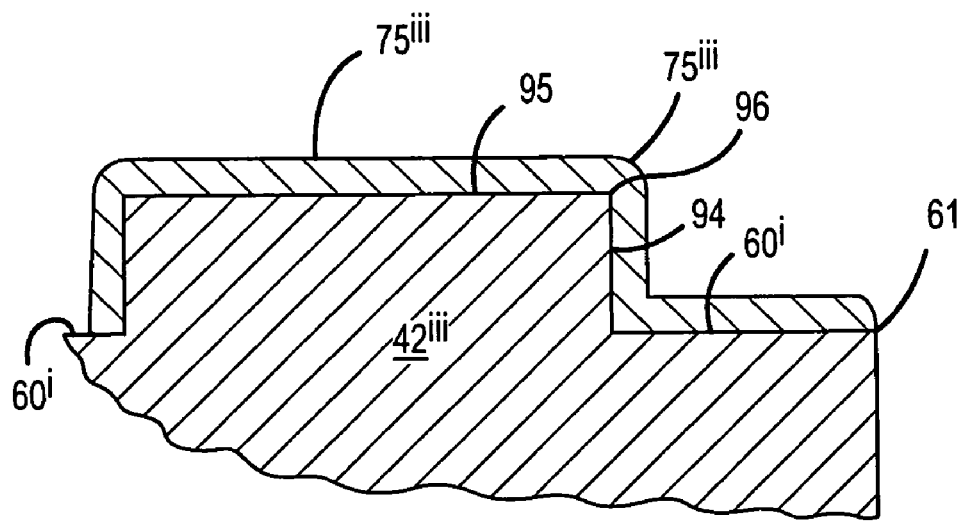
FIG. 5F is another variation of the contact pad presented in FIG. 5D.

Two variations of the embodiment of FIG. 5D are presented in FIGS. 5E and 5F. Common structures/features between these embodiments are identified by the same reference numerals, and a superscripted "ii" and "iii" designation, respectively, is used to denote the existence of at least one difference between the corresponding structures/features. The primary difference between the FIGS. 5D and 5E embodiments is that the contact pad $72^{ii}$ is not coterminous with the face 95 of the protrusion 94 in the case of the FIG. 5E embodiment, in contrast to that presented in FIG. 5D. Other configurations where the contact pad 72ii is not coterminous with the face 95 could be utilized (e.g., where the contact pad is spaced inwardly from the entirety of the edge 96 of the protrusion 94, and not shown). The primary difference between the FIGS. 5D and 5F embodiments is that the contact pad $72^{iii}$ totally encases the protrusion 94 in the case of the FIG. 5F embodiment and more specifically encases its perimeter edge 96, in contrast to that presented in FIG. 5D (e.g., the contact pad $72^{iii}$ is disposed on at least two surfaces on the lower surface $54^{iii}$ of the slider body $42^{iii}$ that are perpendicular to each other). Both the FIGS. 5D and 5E configurations for the contact pads disposed toward the leading edge 46 (contact pads 71, 72) may be utilized by those contact pads that are disposed more toward the trailing edge 48 (contact pads 73 and 74), which will now be discussed.

Figure 6A:
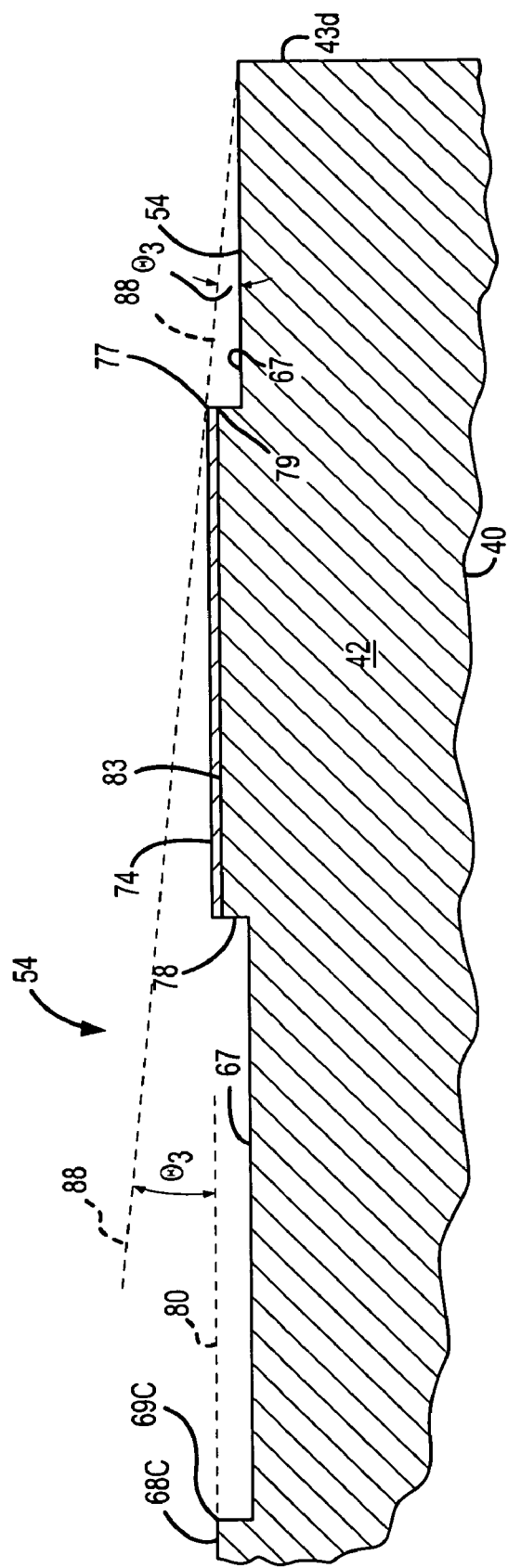
FIG. 6A is a partial cutaway view of the slider of FIG. 3, taken along line 6-6, showing the angular relationship between a corner of the slider body and the peripheral edge of another of the contact pads.
Figure 6B:
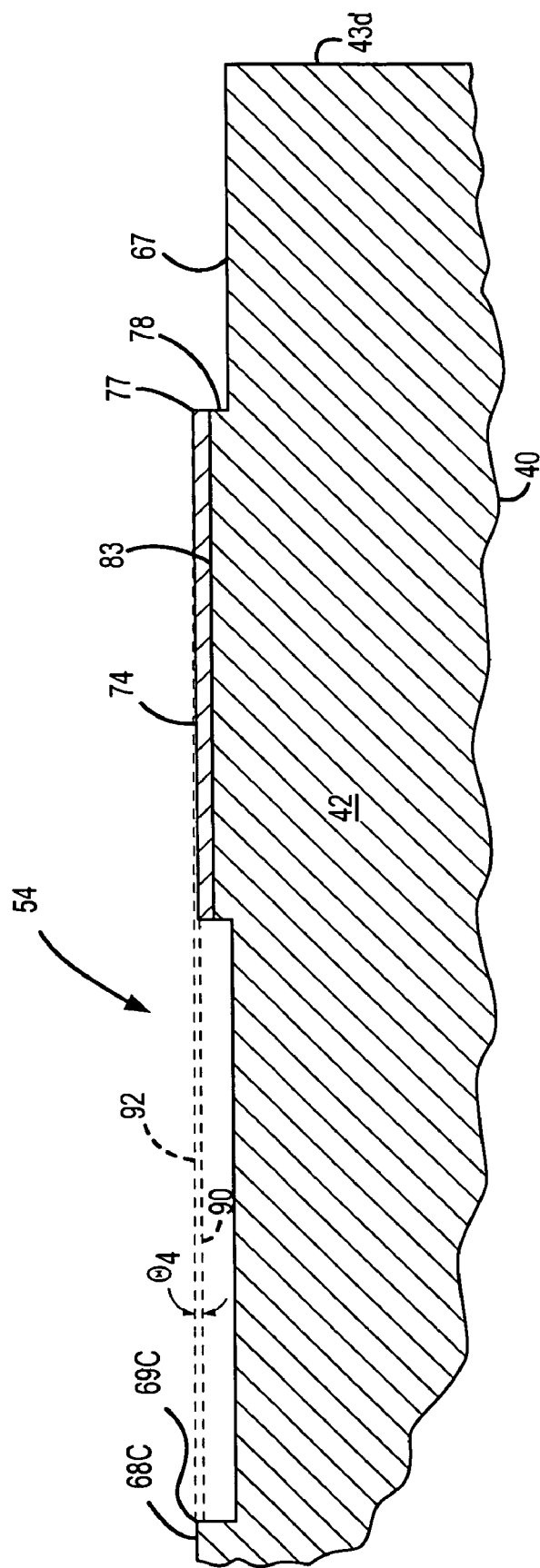
FIG. 6B is a partial cutaway view of the slider of FIG. 3, taken along line 6-6, showing the angular relationship between the edge of one of the rear ABS pads and the peripheral edge of the adjacent contact pad.

Multiple contact pads are also provided at least generally toward the trailing edge 48 of the slider 40, namely the contact pads 73 and 74. All discussion hereafter in relation to the contact pad 74 is equally applicable to the contact pad 73. Referring now to FIGS. 6A-B, the contact pad 74 is disposed on a projection 78 that is part of the slider body 42. Any appropriate configuration for the projection 78 may be utilized (in plan view), including circular as shown. As noted above, typically a carbon overcoat (not shown) would be disposed between the projection 78 and the contact pad 74. In any case, this projection 78 protrudes from the base 67 of the slider body 42 and has a perimeter that is defined by an edge 79. The contact pad 74 protrudes away from the projection 78. In the illustrated embodiment, the contact pad 74 is coterminous with the projection 78 (i.e., covers the entire surface area of the face of the projection 78). However, the types of configurations discussed above in relation to FIGS. 5D and 5E may be utilized by the contact pad 74 as well and as noted above.

FIGS. 6A-6B illustrate third and fourth angles $\Theta_3$, $\Theta_4$, respectively, which define relationships between various slider components disposed on the lower surface 54 of the slider body 42 toward the trailing edge 48 thereof. As shown, a perimeter of the rear ABS pad 68C is defined by an edge 69C, and a perimeter of the self-blending contact pad 74 is defined by an edge 77. Referring to FIG. 6A, the third critical angle $\Theta_3$ refers to an acute angle between the reference plane 80 and a reference plane 88. The reference plane 88 is oriented so as to be tangent to both the corner 43d (the intersection between the side 52 and the trailing edge 48) at the lower surface 54 and a peripheral edge 77 of the self-blending contact pad 74 that is closest to the corner 43d. In any case, the third critical angle $\Theta_3$ is preferably greater than any amount of static pitch/roll to which the slider 40 would likely be exposed during disk drive operations. When positioned in this manner: 1) the contact pad 74 should be that portion of the slider 40 that would contact the data storage surface 14 of the disk 12 upon occurrence of a shock event of some type or due to a load/unload operation that directs the edge 55 of the slider 40 toward the disk 12; and 2) the contact pad 72 should prevent the edge 55 (the intersection between the lower surface 54 and the side 52) from contacting the data storage surface 14 of the disk 12. As with the first critical angle $\Theta_1$, the third critical angle $\Theta_3$ defines a tolerance range for pitch/roll variation of the slider 40 which ultimately depends on the flight characteristics of the slider 40. Accordingly, the third critical angle $\Theta_2$ is preferably steeper than any pitch/roll experienced by the slider 40 during disk drive operations. In one embodiment, the third critical angle $\Theta_3$ is at least about 3 degrees. One parameter that at least assists in the definition of the third critical angle $\Theta_3$ is the amount that the contact pad 74 protrudes away from the base 67 (the collective thickness or height of the projection 78 and the contact pad 74). In one embodiment, the collective thickness or height of the projection 78 and contact pad 74 from adjacent portions of the base 67 is within a range of about 50 to about 200 nanometers.

Referring now to FIG. 6B, the fourth critical angle $\Theta_4$ refers to the acute angle between a reference plane 90 and a reference plane 92. The reference plane 90 is coplanar with both the disk-facing surface 83 of the projection 78 and the reference plane 80 (that contains the ABS system 56), while the reference plane 92 is tangent to an edge 69C of the rear ABS pad 68C and a peripheral edge 77 of the self-blending contact pad 74 that is closest to the corner 43d (the intersection between the side 52 of the slider 40 and its trailing edge 48). The value of the fourth critical angle $\Theta_4$ is preferably small. In one embodiment, the fourth critical angle $\Theta_4$ is less than about 1 degree, and in a preferred another embodiment is less than about ½ degree. Thus, the greater the distance between the edge 69C of the rear ABS pad 68C and the self-blending contact pad 74, the smaller the fourth critical angle $\Theta_4$. One way of reducing the magnitude of the fourth critical angle $\Theta_4$ is to thereby position the self-blending contact pad 74 on the rear projection 78 as far as possible from the edge 69C of the rear projection 68C. Another way to reduce the magnitude of the fourth critical angle $\Theta_4$ is to reduce the amount of vertical offset between the rear ABS pad 68C and the self-blending contact pad 74. In the case of the illustrated embodiment where the rear ABS pad 68C is coplanar where the reference plane 80, as the self-blending contact pad 74 approaches the reference plane 80, thereby approaching a same level of protrusion as the rear ABS pad 68C, the fourth critical angle $\Theta_4$ also become smaller. It should be appreciated that a combination of both factors may be utilized to achieve the desired magnitude for the fourth critical angle $\Theta_4$. It should also be appreciated that as the protrusion of the contact pad 74 approaches that of the rear ABS pad 68C, the surface area of the contact pad 74 becomes more important. That is, the size of the contact pad 74 should be selected such that the contact pad 74 does not substantially contribute to the uplifting forces that are exerted on the slider 40 during disk drive operations.

In one embodiment, the self-blending contact pad 74 and the rear ABS pad 68C are coplanar with each other (not shown). In another embodiment, the self-blending contact pad 74 is more protruded than the rear ABS pad 68C (not shown). That is, the contact pad 74 extends beyond the reference plane 80 (in a direction that is away from the upper surface 53 of the slider 40). In all instances, it should be appreciated that the contact pad 74 should be sized such that it does not become part of the ABS system 56. That is, in all instances the size of the contact pad 74 should be selected such that the contact pad 74 does not substantially contribute to the uplifting forces that are exerted on the slider 40 during disk drive operations. In one embodiment, the surface area of the contact pad 74 (that at least generally faces the data storage surface 14 of the corresponding disk 12) is no more than about 0.01 mm².

Figure 6C:
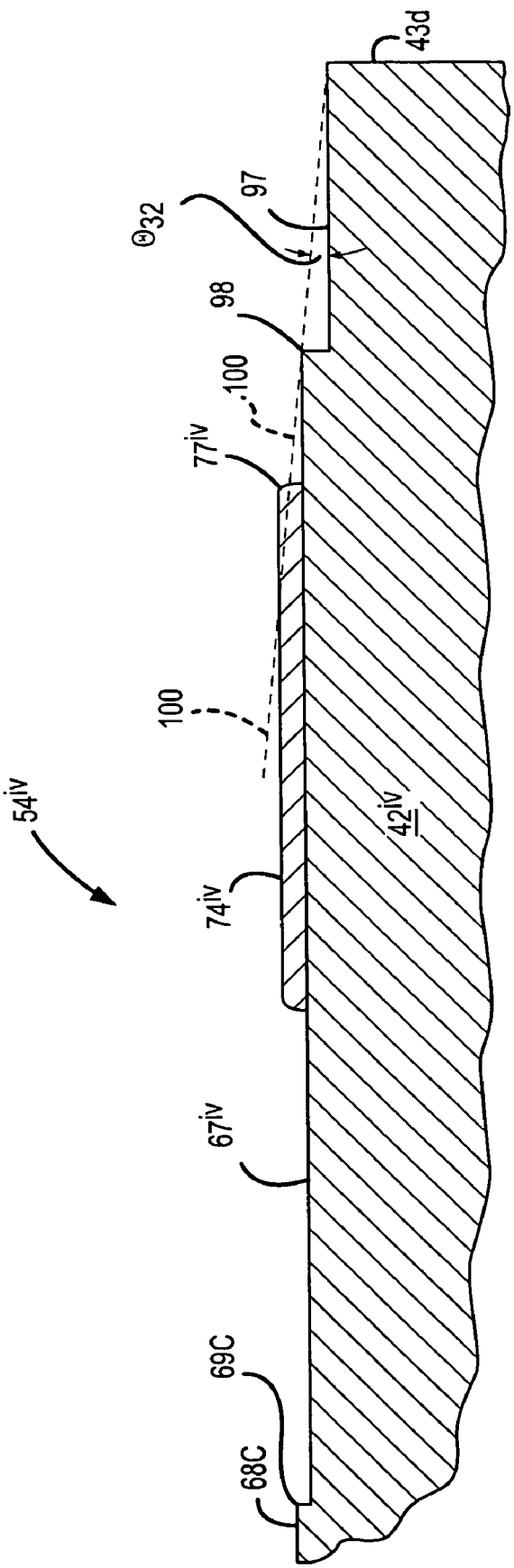
FIG. 6C is a partial cut away view of a variation of the slider of FIG. 3, taken along line 6-6, having the contact pad disposed away from an edge of the slider body, and showing the angular relationship between a side edge of the slider body and an inward edge of the slider body.

A variation of the embodiment of FIGS. 6A-B is illustrated in FIG. 6C in the form of a slider $40^{iv}$. Common structures/features between these embodiments are identified by the same reference numerals, and a superscripted "iv" designation is used to denote the existence of at least one difference between the corresponding structures/features. One difference between the FIGS. 6C and 6A-B embodiments is that there is an exposed edge 98 between the contact pad 74$^{iv}$ and the corner 46d that is defined by the intersection of the side 52 with the trailing edge 48. This edge 98 is defined by an intersection between the base 67$^{iv}$ and a recess 97 this is disposed at/extends along the trailing edge 48 of the slider 40$^{iv}$. Another is that the contact pad 74$^{iv}$ is formed directly on the base 67 (versus on a protrusion, such as the projection 78 as in the case of the embodiment of FIGS. 6A-B). Since the configuration that is presented in FIG. 6C is substantially similar to the configuration of FIG. 5D, the discussion presented above in relation to the embodiment of FIG. 5D (on a contact pad 72 that is disposed toward the leading edge 46 of the slider 40) is equally applicable to the embodiment of FIG. 6C (on a contact pad 74$^{iv}$ that is disposed toward the trailing edge 48 of the slider 40$^{iv}$). Again, what is of importance is that the contact pad 74$^{iv}$ should be disposed such that the contact pad 74$^{iv}$ extends beyond a reference plane 100 that is tangent to the corner 43d (the intersection between the side 52 and the trailing edge 48 of the slider body 42) at the lower surface 54 and the edge 98 on a perimeter of the base 67$^{iv}$. This increases the potential that the contact pad 74$^{iv}$, and not the edges 67 or the corner 43d, will contact the corresponding data storage disk 12 upon exposure of the slider 40$^{iv}$ to at least certain forces (e.g., excessive PSA and/or RSA).

The foregoing description of the present invention has been presented for purposes of illustration and description. Furthermore, the description is not intended to limit the invention to the form disclosed herein. Consequently, variations and modifications commensurate with the above teachings, skill, and knowledge of the relevant art, are within the scope of the present invention. The embodiments described hereinabove are further intended to explain best modes known of practicing the invention and to enable others skilled in the art to utilize the invention in such or other embodiments, and with various modifications required by the desired application(s) or use(s), of the present invention. It is intended that the appended claims be construed to include alternative embodiments to the extent permitted by the prior art.

What is claimed is:

1. A method for operating a disk drive that comprises a first data storage disk and a slider, wherein said slider comprises a central, longitudinal reference axis and a shock pad system, wherein said shock pad system comprises at least one shock pad, wherein an entirety of each said shock pad of said shock pad system is spaced from said central, longitudinal reference axis, and wherein said shock pad has a hardness of less than about 9 on the Mohs hardness scale, and wherein said method comprises the steps of:
   flying said slider above said first data storage disk such that an entirety of said slider is in spaced relation to said first data storage disk;
   directing said slider toward said first data storage disk during said flying step;
   contacting said slider against said first data storage disk based upon said directing step;
   limiting contact between said slider and said first data storage disk from said contacting step to said shock pad system; and
   burnishing said at least one shock pad using said first data storage disk and without removing any substantial portion of said first data storage disk during said contacting step.

2. A method, as claimed in claim 1, wherein said burnishing step comprises forming a flat on said at least one shock pad.

3. A method, as claimed in claim 1, wherein said burnishing step comprises increasing an area of said at least one shock pad that interfaces with said first data storage disk.

4. A method, as claimed in claim 3, wherein said burnishing step comprises executing second directing, contacting, limiting, and burnishing steps, wherein said area of said at least one shock pad that interfaces with said first data storage disk in said second contacting step experiences less unit pressure than during a first said contacting step.

5. A method, as claimed in claim 3, wherein said burnishing step comprises exposing an edge of said slider, wherein said edge is substantially coplanar with said area of said at least one shock pad that interfaces with said first data storage disk.

6. A method, as claimed in claim 3, wherein said burnishing step comprises exposing an edge of said slider, wherein said edge is totally contained within said area of said at least one shock pad that interfaces with said first data storage disk.

7. A method, as claimed in claim 6, wherein said burnishing step comprises executing second directing, contacting, limiting, and burnishing steps, wherein an area of said at least one shock pad that interfaces with said first data storage disk experiences less unit pressure than during a first said contacting step.

8. A method, as claimed in claim 1, wherein said burnishing step comprises generating particulates of said at least one shock pad, wherein said particulates sublimate to a gas.

9. A method for operating a disk drive that comprises a first data storage disk and a slider, wherein said slider comprises a central, longitudinal reference axis and a shock pad system, wherein said shock pad system comprises at least one shock pad, wherein an entirety of each said shock pad of said shock pad system is spaced from said central, longitudinal reference axis, and wherein said shock pad has a hardness of less than about 9 on the Mohs hardness scale, and wherein said method comprises the steps of:
   rotating said first data storage disk relative to said slider;
   positioning said slider into an operational interfacing relationship with said data storage disk;
   exerting a lifting force on said at least one air bearing surface of said slider using said rotating step;
   directing said slider toward said first data storage disk during at least one of said positioning and exerting steps;
   contacting said slider against said first data storage disk based upon said directing step;
   limiting contact between said slider and said first data storage disk from said contacting step to said shock pad system; and
   burnishing said at least one shock pad using said first data storage disk and without removing any substantial portion of said first data storage disk during said contacting step.

10. A method, as claimed in claim 9, further comprising the step of establishing a gap between said slider and an entirety of said first data storage disk at least at some point in time during said rotating step, wherein said establishing step includes said burnishing step and said exerting step.

11. A method, as claimed in claim 9, wherein said burnishing step comprises forming a flat on said at least one shock pad.

12. A method, as claimed in claim 9, wherein said burnishing step comprises increasing an area of said at least one shock pad that interfaces with said first data storage disk.

13. A method, as claimed in claim 12, wherein said burnishing step comprises executing second directing, contacting, limiting, and burnishing steps, wherein said area of said at least one shock pad that interfaces with said first data storage disk experiences less unit pressure than during a first said contacting step.

14. A method, as claimed in claim 12, wherein said burnishing step comprises exposing an edge of said slider, wherein said edge is substantially coplanar with said area of said at least one shock pad that interfaces with said first data storage disk.

15. A method, as claimed in claim 12, wherein said burnishing step comprises exposing an edge of said slider, wherein said edge is totally contained within said area of said at least one shock pad that interfaces with said first data storage disk.

16. A method, as claimed in claim 9, wherein said burnishing step comprises executing second directing, contacting, limiting, and burnishing steps, wherein an area of said at least one shock pad that interfaces with said first data storage disk experiences less unit pressure than during a first said contacting step.

17. A method, as claimed in claim 9, wherein said burnishing step comprises generating particulates of said at least one shock pad, wherein said particulates sublimate to a gas.

18. A method for operating a disk drive that comprises a first data storage disk and a slider, wherein said slider comprises a central, longitudinal reference axis, a lower surface, and a shock pad system, wherein said shock pad system comprises four shock pads where a different one of said four shock pads is disposed at least generally at each of four corners of said lower surface of said slider, and wherein at least one said shock pad has a hardness of less than about 9 on the Mohs hardness scale, and wherein said method comprises the steps of:

limiting contact between said slider and said first data storage disk to said shock pad system during each of first and second conditions, said first condition being during a loading of said slider onto said first data storage disk, said second condition being after said slider has began to fly such that an entirety of said slider is in spaced relation to said first data storage disk; and burnishing at least one shock pad of said shock pad system using said first data storage disk and without removing any substantial portion of said first data storage disk when said slider comes into contact with said first data storage disk.

19. A method, as claimed in claim 18, wherein said each of said four shock pads are formed from a different material that defines a body of said slider.

20. A method, as claimed in claim 18, wherein said slider comprises a slider body formed form a first material, and wherein each of said four shock pads are formed from a second material that is softer than said first material.

* * * * *